United States Patent
Earl et al.

(10) Patent No.: US 9,071,576 B1
(45) Date of Patent: Jun. 30, 2015

(54) APPLICATION RATE LIMITING WITHOUT OVERHEAD

(71) Applicant: Sprint Communications Company L.P., Overland Park, KS (US)

(72) Inventors: Bryson Earl, Altamonte Springs, FL (US); Todd M. Szymanski, Winter Park, FL (US)

(73) Assignee: Sprint Communications Comapny L.P., Overland Park, KS (US)

(*) Notice: Subject to any disclaimer, the term of this patent is extended or adjusted under 35 U.S.C. 154(b) by 46 days.

(21) Appl. No.: 13/797,998

(22) Filed: Mar. 12, 2013

(51) Int. Cl.
*G06F 9/00* (2006.01)
*H04L 29/06* (2006.01)

(52) U.S. Cl.
CPC .................. *H04L 63/0236* (2013.01)

(58) Field of Classification Search
CPC ............. H04L 61/1511; H04L 51/12; H04L 29/12066; H04L 63/145; H04L 12/585; H04L 63/1458; H04L 43/16
USPC .......................................................... 726/11
See application file for complete search history.

(56) References Cited

U.S. PATENT DOCUMENTS

| | | | |
|---|---|---|---|
| 7,624,447 B1* | 11/2009 | Horowitz et al. | 726/23 |
| 8,595,829 B1* | 11/2013 | Kane | 726/22 |
| 2006/0036720 A1* | 2/2006 | Faulk | 709/223 |
| 2009/0037950 A1* | 2/2009 | Ching et al. | 725/36 |
| 2010/0082811 A1* | 4/2010 | Van Der Merwe et al. | 709/225 |
| 2010/0218250 A1* | 8/2010 | Mori et al. | 726/22 |
| 2011/0055921 A1* | 3/2011 | Narayanaswamy et al. | 726/22 |
| 2013/0110771 A1* | 5/2013 | Merriman et al. | 707/609 |
| 2014/0150095 A1* | 5/2014 | Zhao et al. | 726/22 |

* cited by examiner

*Primary Examiner* — Andrew Nalven
*Assistant Examiner* — Mary Li (57) ABSTRACT

A system for managing application service requests. The system processes requests using a first processor, stores a record of the requests in memory using a second processor, and counts the total number of requests received over a time interval using the second processor. If the total number of requests are less than a first threshold, the stored records are dropped. Otherwise, the stored records are analyzed to determine if requests from a single source Internet protocol address exceed a second threshold. If the number of requests from a single source Internet protocol address exceeds the second threshold, the subject Internet protocol address is blacklisted to a firewall through which the service requests pass before reaching the first processor. The requests are visible to the second processor before they are processed by the firewall.

18 Claims, 5 Drawing Sheets

APPLICATION RATE LIMITING WITHOUT OVERHEAD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network based applications are becoming more predominant in our daily lives with the rapid development and popularization of portable network capable devices. With the development of network based applications and portable network capable devices, the methods of electronic attacks are also changing. Recent electronic attacks often exploit more fire-and-forget type of packets. Such fire-and-forget type of packets involve no handshake between the sender and receiver, their source attribute can be spoofed, and the receiver has no way of verifying the legitimate sender before responding. Public facing servers can be utilized along with fire-and-forget type of packets in network attacks and make the network attack a lot more effective. When public network servers are utilized as weapons to attack victim electronic devices in such attacks, they may need to be reset, and/or may be unable to provide intended service, or communicate adequately to clients. The impact of the network attacks on the user experience may have implications for user satisfaction with the network application provider or the network service provider.

SUMMARY

In an embodiment, a system for managing application service requests is disclosed. The system comprises a memory, a first processor, a second processor, an operating system that receives a first plurality of service requests, wherein each of the first plurality of service requests comprises an Internet protocol address. The operating system copies the first plurality of service requests in the memory, and derives a second plurality of service requests from the first plurality of service requests by purging service requests among the first plurality of service requests that comprise a black listed Internet protocol address. The system for managing application service requests further comprises a server application stored in the memory that, when executed by the first processor receives the second plurality of service requests from the operating system and processes the second plurality of service requests. In addition, the system for managing application service requests comprises a service request monitor application stored in the memory of the system that, when executed by the second processor, reads the first plurality of service requests from the memory, counts the first plurality of service requests, and determines when the rate of service requests exceeds a first threshold. When the rate of service requests exceeds the first threshold, the service request monitor application analyzes the rate of service requests associated with each Internet protocol address of the service requests, and sends a message to the operating system to black list the Internet protocol address associated with a rate of service requests that exceeds a second threshold, whereby the service request monitor application limits the rate of service requests associated with a single Internet protocol address.

In an embodiment, a method of managing application service requests is disclosed. The method comprises receiving application service requests, wherein each service request comprises an Internet protocol (IP) address of a remote host, copying the application service requests to a memory, processing the application service requests by a firewall application to purging application service requests comprising an Internet protocol address that is black listed by the firewall application, processing the application service requests that were not purged by a server application executed by a first processor of a server computer, counting the application service requests copied to the memory by a service request monitor application executed by a second processor of the server computer, determining when the total number of application service requests received in a predefined time interval exceeds a second threshold, determining when the rate of application service requests associated with an Internet protocol address exceeds a first threshold, and taking proactive action when the rate of application service requests associated with the Internet protocol address exceeds the first threshold, whereby the rate of service requests of remote hosts is limited.

In an embodiment, a method of parrying a domain name service (DNS) amplification denial of service (DoS) attack is disclosed. The method comprises receiving domain name service requests, wherein each service request comprises an Internet protocol (IP) address of a remote host, copying the domain name service requests to a memory, processing the domain name service requests by a firewall application to purging domain name service requests comprising an Internet protocol address that is black listed by the firewall application, processing the domain name service requests that were not purged by a server application executed by a first processor of a server computer, counting the domain name service requests copied to the memory by a service request monitor application executed by a second processor of the server computer, determining when the rate of domain name service requests associated with an Internet protocol address exceeds a first threshold, and sending a message to the firewall application to black list an Internet protocol address when the rate of domain name service requests associated with the Internet protocol address exceeds the first threshold, whereby the rate of domain name service requests of remote hosts is limited.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by network capable devices that interfere with the proper operation of application service systems—for example the ability of application service servers to handle service requests. The problems may result from abusive network traffic trying to attack victim remote hosts by using public facing servers as amplifiers. For example, an attacker host may send to a public facing domain name service server 40-byte packets as domain name service (DNS) lookup requests comprising a spoofed source Internet protocol address of a victim host at a rate of 200 times per second. The domain name service server may reply with 4000-byte packets as domain name service answers to the victim host with the Internet protocol address comprised in the above request packets. The present disclosure teaches a system and method for persistently monitoring service request behavior and throttling or ignoring service requests of the abusive network traffic under predefined circumstances.

For example, a server may persistently capture network traffic, periodically count the total number of incoming packets and decide whether within a predefined time interval the total number of incoming packets exceeds a predefined amount. If not, the captured network traffic is discarded and the server moves on to the next cycle of capturing and counting. For example, the server may have a threshold of 10,000 queries within 5 minutes, and if for a 5 minute interval the total number of incoming packets does not exceed 10,000, the server deletes the captured packets and starts a new cycle of capturing and counting incoming packets. On the other hand, if the total number of incoming packets exceeds a predefined amount, the server further analyzes the rate of incoming packets per unique source Internet protocol address and detects when an incoming packet rate per unique source Internet protocol address exceeds a second predefined amount. For example, when a domain name service server detects a rate of over 2000 queries per second from a unique source Internet protocol address, a monitoring application may take proactive action. When abusive network traffic is detected the server can take a variety of proactive steps to respond to the abusive network traffic. For example, in an embodiment, the server may halt or pause while receiving queries from the source Internet protocol address and popup a dialog box notifying the server administrator of the anomalous behavior and asking the server administrator to approve completion of the paused network activity.

Alternatively, the server may send a message to the firewall application to block messages received from the source Internet Protocol address associated with the abusive traffic. The server may throttle the messages sent by the source Internet Protocol address associated with the abusive traffic by managing a duty cycle of blocked versus unblocked commands to the firewall application. For example, the server may throttle the traffic from the subject source Internet Protocol address by commanding the address to be blocked by the firewall for a desirable percentage of time and unblocked for the remaining percentage of time, for example 10% of the time, 25% of the time 50% of the time, 75% of the time, 90% of the time, or any percentage of time. The blocking and unblocking may be alternated over predefined periods of time like over a one second time interval, over a one minute time interval, over a ten minute time interval, over a one hour time interval, or some other time interval.

For example, the server may command the firewall to block traffic from the subject source Internet Protocol address for 6 seconds and to allow traffic from the subject source Internet Protocol address for the remaining 54 seconds of a 1 minute interval to achieve an about 10% blockage or throttle state. The server may command the firewall to block traffic from the subject source Internet Protocol address for 15 seconds and to allow traffic from the subject source Internet Protocol address for the remaining 45 seconds of a 1 minute interval to achieve an about 25% blockage or throttle state. The server may command the firewall to block traffic from the subject source Internet Protocol address for 30 seconds and to allow traffic from the subject source Internet Protocol address for the remaining 30 seconds of a 1 minute interval to achieve an about 50% blockage or throttle state. The server may command the firewall to block traffic from the subject source Internet Protocol address for 54 seconds and to allow traffic from the subject source Internet Protocol address for the remaining 6 seconds of a 1 minute interval to achieve an about 90% blockage or throttle state. One of skill in the art will appreciate that the throttling may be achieved over different time intervals, for example over a 1 second time interval, over a 30 second time interval, over a 3 minute time interval, over a 5 minute time interval, over a 10 minute time interval, over a 20 minute time interval, over an hour time interval, or some other time interval.

In an embodiment, the server may send a message to the firewall application to blacklist the source Internet protocol address associated with the abusive traffic for a period of time and send a message to the victim host to notify the victim host about the attack. The server may also copy the packet captures from the memory to a file, delete the packet captures in the memory, and conduct further analysis.

In an embodiment, the firewall maintains a blacklist and a whitelist. As one of ordinary skill in the art understands, the firewall rejects incoming data packets from blacklisted hosts, for example from hosts having an Internet Protocol address listed in the blacklist, and the firewall passes incoming data packets from whitelisted hosts, for example hosts having an Internet Protocol address listed in the whitelist. A firewall may reject incoming data packets for a variety of reasons and/or based on a variety of rules other than the source IP address encapsulated in the packet header, but if a host is identified in the whitelist, even if data packets from that host would be rejected based on one or more firewall rules, the data packets are allowed to pass through the firewall.

Any Internet protocol address added to the blacklist will be blocked for a predefined period of time, for example 2 minutes, 5 minutes, 10 minutes, or some other period of time, and then removed from the blacklist after the predefined period of time if the Internet protocol address is no longer associated with a service request rate greater than the predefined rate limit. When an Internet protocol address is blocked by the firewall, any application service request from the Internet protocol address will not be processed by the server application. When an Internet protocol address is on the whitelist of the firewall, the Internet protocol address will not be added to the blacklist even if the Internet protocol address is associated with a great amount of network traffic that exceeds the predefined traffic rate limit. The firewall keeps the whitelist so that important clients of the server can always be serviced whenever it is possible.

The action of adding the Internet protocol address to the blacklist and removing it from the blacklist may be performed automatically, for example by an application executing on the server that invokes application programming interface (API) commands provided by the firewall software. The actions of adding and removing the Internet protocol address from a whitelist of a firewall automatically (e.g., by invoking an API command of the firewall by other software instructions executing on the server), without manual administrative intervention and for relatively short and/or temporary periods of time, may be a new functional behavior of using firewalls and may entail extending and/or developing new capabilities of firewall software to provide this functionality.

Figure 1:
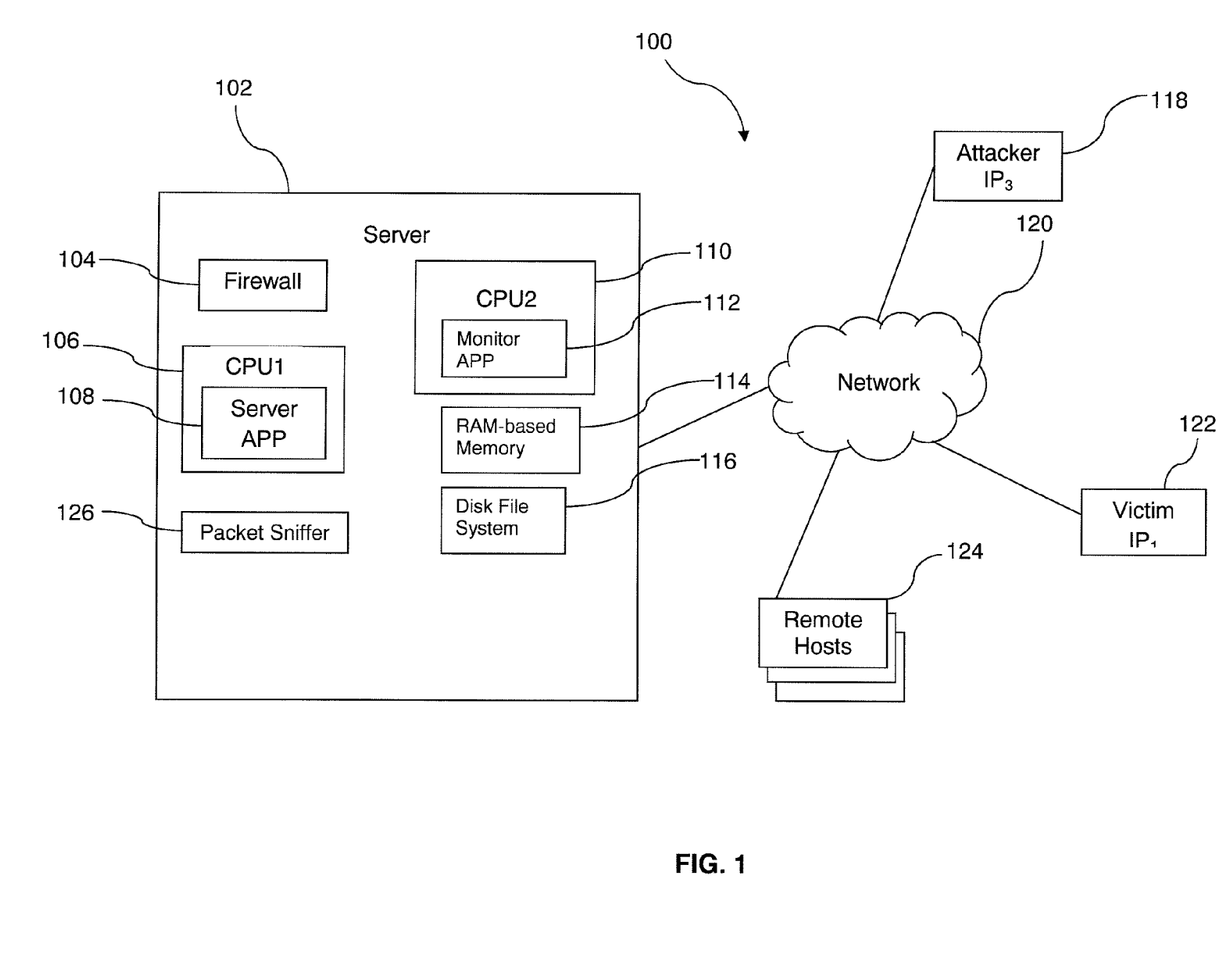
FIG. 1 is an illustration of a network system according to an embodiment of the disclosure.

Turning now to FIG. 1, a network system 100 is described. In an embodiment, the network system 100 comprises a plurality of servers 102. The server 102 may comprise a firewall application 104, a CPU1 106, a CPU2 110, random access memory (RAM)-based memory 114, and a disk file system 116. The server 102 is coupled to a network 120, for example a server 102 operated by a network service provider. An attacker computer 118, a victim computer 122, and one or more remote hosts 124 all have access to the network 120. The network 120 may comprise any combination of private and public networks.

It is understood that the system 100 may comprise any number of servers 102, any number of attackers 118, any number of victims 122, and any number of remote hosts 124. The attacker 118, victim 122, and remote host 124 may be any of a computer, a tablet computer, a mobile phone, a personal digital assistant (PDA), a media player, a game console, an Internet digital media streaming device, or another network capable device. The attacker 118, victim 122, and remote hosts 124 may access the network 120 through wired or wireless access network. The wired access network may be abstracted in different ways and may comprise cable modems and Ethernet routers, switches, or hubs. The wireless access network may also be abstracted in different ways and may comprise wireless access points, cable modems, Ethernet or wireless routers, switches, or hubs, servers and data storages such as home location registers (HLRs) or servers that implement the functionality of home location registers, visitor location registers (VLRs) or servers that implement the functionality of visitor location registers, base transceiver stations, base station controllers (BSCs), mobile switching centers (MSCs), and other network nodes that are specifically associated with providing wireless access and connectivity to the remote hosts.

The firewall 104 may be a firewall, a proxy server, a domain name service forwarder, or other security related software. In an embodiment, the firewall 104 may purge queries from an attacker 118 associated with an Internet protocol address on a blacklist that the firewall 104 maintains. Application service requests from the attacker 118 associated with Internet protocol addresses on the blacklist are purged by the firewall 104. The remaining application service requests that are not purged by the firewall 104 will then be processed by the server app 108. The monitor app 112 or the operating system may set a timer once an Internet protocol address is added to the blacklist and after a predefined time period the Internet protocol address may be removed from the blacklist if the attacker 118 associated with the Internet protocol address does not continue sending abusive network traffic to the server 102 after the Internet protocol address was added to the blacklist. The timer may be greater than or equal to the time interval used to determine whether the total number of incoming packets exceeds a predefined threshold earlier. For example, if the threshold for the total number of incoming packets is 10,000 packets within a time interval of 5 minutes, the timer here for the blacklist of the firewall may be greater than or equal to 5 minutes. After removing the Internet Protocol address from the blacklist, the firewall 104 may stop purging application service requests from the attacker 118 associated with the Internet protocol address that was just removed from the blacklist. If the attacker 118 continues sending abusive network traffic to the server 102 after the Internet protocol address associated with the attacker 118 was added to the blacklist, the monitor app 112 resets the timer for the Internet protocol address on the blacklist. The firewall 104 continues purging any application service request from the Internet protocol address associated with the spoofed packet, the victim 122.

The server app 108 may be any of a domain name service server app, a web server app, a login server app, or another network-based server app. The server app 108 may process application service requests that are not purged by the firewall 104. It may be executed on a CPU1 106. The server app 108 and the monitor app 112 may be executed on different processors so that the operating space of both the server app 108 and the monitor app 112 may remain mutually exclusive. As such, no overhead to the server app 108 may be generated by the monitor app 112 and both the server app 108 and the monitor app 112 may achieve peak performance.

In an embodiment, the monitor app 112 may be executed by the second CPU 110, additional idle processors, additional idle cores, or different threads from the server app 108 while the server app 108 is executed on a set number of CPU cores. In an embodiment, the monitor app 112 persistently captures incoming packets to the server 102 and periodically analyzes network traffic. When the rate of application service requests per unique Internet protocol address exceeds a predefined threshold B, the monitor app 112 may take precautionary or remediating actions. The monitor app 112 may send messages and/or reports to the firewall 104, for example providing Internet protocol addresses to be blacklisted, for example IP addresses of hosts associated with excessive rates of application service requests. The monitor app 112 may also maintain a whitelist and never purge queries from Internet protocol addresses on the whitelist. The monitor app 112 may not blacklist an Internet protocol address associated with a rate of application service requests that exceeds the application service request rate limit if the Internet protocol address associated with rate of application service requests that exceeds the application service request rate limit is on the whitelist. Instead, the monitor app 112 may continue passing application service requests associated with Internet protocol addresses on the whitelist. When the administrator of the server 102 sees too many queries from per unique Internet protocol address in a network traffic log, the server administrator may notify the customer associated with the Internet protocol address with an application service request rate that exceeds an application service request rate limit about the abnormal traffic activities.

The monitor app 112 may copy packet captures of application service requests to the RAM-based memory 114, read the application service requests from the RAM-based memory 114, and count the total number of the application service requests. For example, the monitor app 112 may fetch all network packet captures from a network sniffer/packet capturing tool 126, such as Wireshark, tcpdump, or another network sniffer/packet capturing tool, including packets that will be purged by the firewall 104. The monitor app 112 may then copy packet captures of application service requests to the RAM-based memory 114. The monitor app 112 may read from the RAM-based memory 114 the packet captures and count the total number of application service requests to the server 102.

Once the total number of the application service requests exceeds a predefined Threshold A, for example about 5,000 application service requests, about 10,000 application service requests, or about 20,000 application service requests, or some other number of application service requests over a predefined time interval, for example about 2 minutes, about 5 minutes, about 10 minutes, or some other time interval, the monitor app 112 may further analyze the packet captures. The counter to count the total number of application service requests that were sent to the server 102 may then be cleared and the counter may start counting again the total number of application service requests to the server 102 from zero. Additionally, the timer to count the time interval of application service requests that were sent to the server 102 may then be cleared and the timer may start counting again the time interval of application service requests to the server 102 from zero. On the other hand, if the total number of the application service requests does not exceed the predefined Threshold A in the predefined time interval, the captured packets in the RAM-based memory 114 will be deleted, the counter for the total number of the application service requests and the timer for the time interval of the application service requests will also be cleared and started again, but no further analysis of the queries will be conducted.

In an embodiment, after the total number of the application service requests exceeds a predefined Threshold A over a predefined time interval, the monitor app 112 may analyze the application service request packet captures per unique source Internet protocol address. For example, the monitor app 112 may review the source address field of each packet and count the total number of queries per unique source Internet protocol address.

The monitor app 112 may then calculate the rate of the application service requests per unique source Internet protocol address. Note that the Internet Protocol address may be an Internet Protocol version 4 (IPv4) address, an Internet Protocol version 6 (IPv6) address, or another version of Internet Protocol address. For example, the monitor app 112 may divide the total number of application service requests from a unique source Internet protocol address by the total period of time for all the application service requests per unique source Internet protocol address to get the application service request rate for each source Internet protocol address. When the application service request rate of a unique source Internet protocol address exceeds a predefined Threshold B of rate limit, for example about 300 queries per second, about 450 queries per second, about 500 queries per second, or some other rate limit, the monitor app 112 may take some precautionary or proactive actions. For example, the monitor app 112 may send messages and/or reports to the firewall 104, for example providing a list of attackers 118 associated with the source Internet protocol addresses with rates that exceed the rate limit. Additionally, the monitor app 112 may copy the application service requests in the RAM-based memory 114 to the disk file system 116 and conduct further analysis. The monitor app 112 may then delete packet captures in the RAM-based memory 114.

Note that some legitimate hosts legitimately generate very high rates of application service requests, possibly higher than the limit rate, and those hosts may be whitelisted. When the source Internet protocol address is on the white list of the monitor app 112, the monitor app 112 may record the abnormal network activities of the source Internet protocol addresses on the white list in a log. In an embodiment, the server administrator may then review the log with the abnormal network activities and send reports and/or messages to clients associated with the source Internet protocol addresses on the white list, for example to notify the clients of the abnormal network activities. In an embodiment, the monitor app 112, the operating system, or the firewall 104 maintains a whitelist with important source Internet protocol addresses and Internet protocol ranges and never purges application service requests from Internet protocol addresses on the whitelist.

When the source Internet protocol addresses associated with application service request rate that exceed the rate limit and the source Internet protocol addresses are not on the white list of the monitor app 112, the monitor app 112 then adds the source Internet protocol addresses to the blacklist that the firewall 104 maintains. The blacklisted Internet protocol address may correspond to a victim host 122. Some attacker 118 with some unknown source Internet protocol addresses $IP_3$ may send application service requests at high rates with spoofed Internet protocol addresses of the victim host 122. The blacklisting action the monitor app 112 took may result in the victim host being unable to complete legitimate application service requests to the server 102 during the time when the victim host 122 is on the black list.

Figure 2:
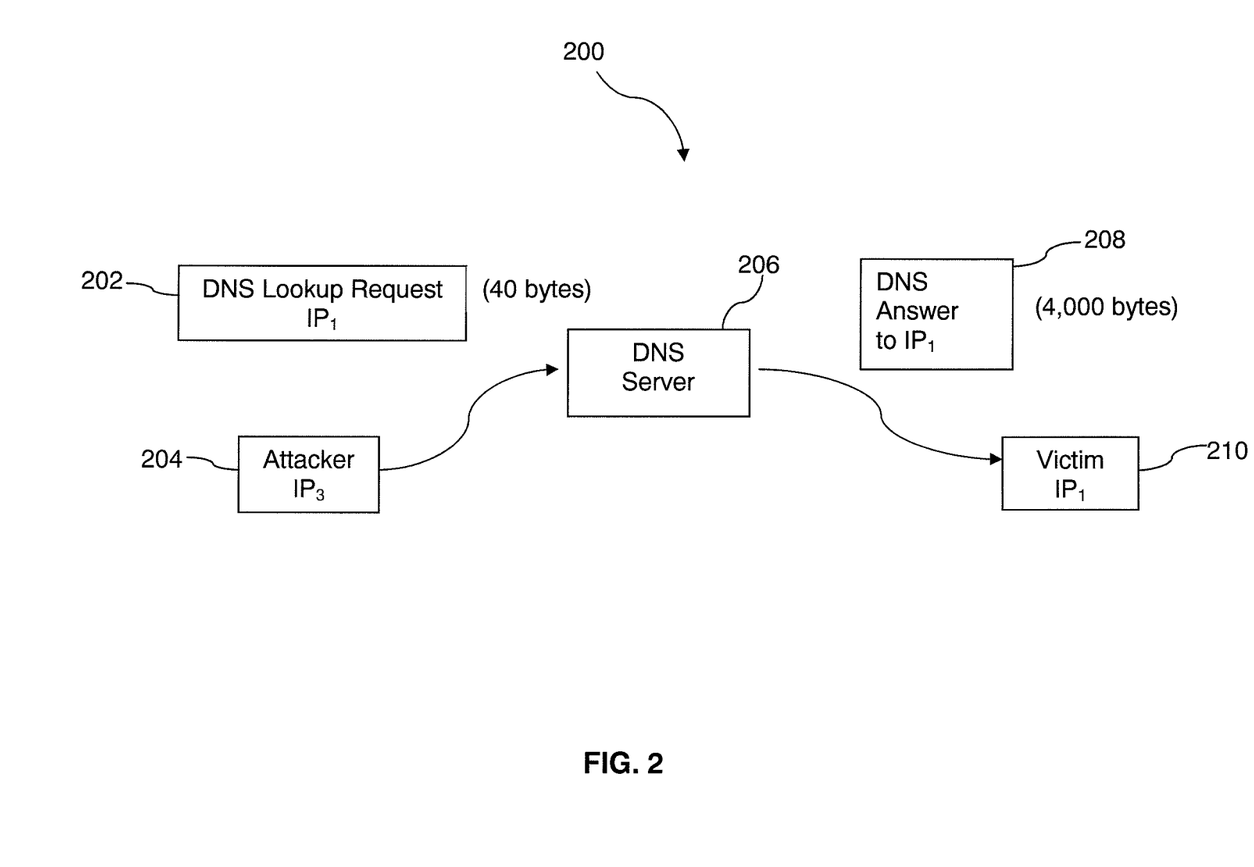
FIG. 2 is an illustration of another network system according to an embodiment of the disclosure.

Turning now to FIG. 2, a network system 200 is described. In an embodiment, an attacker 204 may send a domain name service lookup request 202 associated with an Internet protocol address $IP_1$ of a victim 210 to a domain name service server 206. The attacker 204 may achieve this by adding the Internet protocol address $IP_1$ of the victim 210 as the request initiator's Internet protocol address in the domain name service lookup request packet. The domain name service server 206 may be exploited by the attacker 204 as an amplifier in this situation because of two main reasons. The first main reason is the increase in the reply size to the domain name service lookup request. For example, the query size of the domain name service lookup request 202 may be 18 bytes, 20 bytes, 40 bytes, or some other length. The domain name service server 206 may reply to the victim 210 associated with the source Internet protocol address $IP_1$ with a domain name service answer 208 with an answer size of 1800 bytes, 2000 bytes, 4000 bytes, or some other length accordingly. The second main reason for the effectiveness of a domain name service amplification denial-of-service attack lies in that large answers can create Internet protocol fragments. The attacker 204 may gear the answer payload size specification of the domain name service request towards producing fragmentation.

Figure 3:
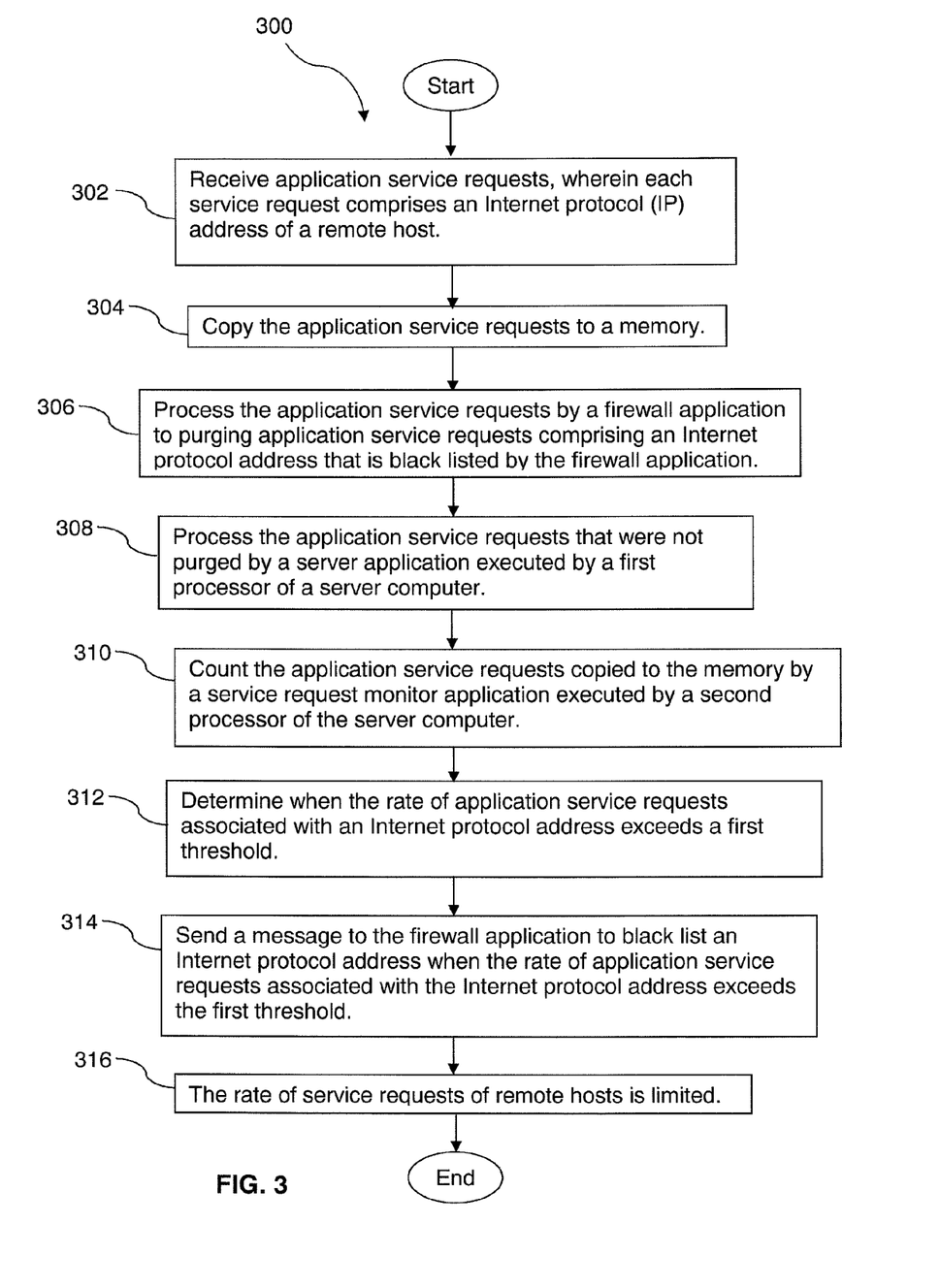
FIG. 3 is a flow chart illustrating a method according to an embodiment of the disclosure.

Turning now to FIG. 3, a method 300 is described. At block 302, the application service requests are received and each service request comprises a source Internet protocol address of a remote host. The Internet protocol address of the remote host provided in the service request is treated as the Internet protocol address of the application service request initiator. At block 304, the application service requests are copied to a memory. In an embodiment, the monitor app 112 may perform at least part of the method 300. For example, the monitor app 112 may copy all the application service requests to a memory of the server 102. For example, the monitor app 112 may copy the application service requests from a plurality of the attacker 118, the victim 122, and other remote hosts 124 to the memory 114 of the server 102.

At block 306, the application service requests are processed by a firewall application to purge application service requests comprising a source Internet protocol address that is blacklisted by the firewall application. For example, the firewall app 104 may purge application service requests associated with source Internet protocol addresses that are blacklisted by the firewall app 104, and the application service requests purged by the firewall app 104 will not be processed by the server app. At block 308, the application service requests that were not purged by a server application are processed and executed by a first processor of a server computer. For example, the first processor 106 of a server computer executes the server app 108, and the server app 108 processes the application service requests. For example, if the server app 108 is a domain name service application and the application service requests are domain name service queries, the server app 108 may process the domain name service queries and respond with domain name service answers. Additionally, if the server app 108 is a simple mail transfer protocol (SMTP) or hypertext transfer protocol (HTTP), the application service requests are processed according to simple mail transfer protocol or hypertext transfer protocol standards.

At block 310, count the application service requests that were copied to the memory by a service request monitor application executed by a second processor of the server computer. For example, the monitor app 112 may count the total number of application service requests that were copied to the RAM-based memory 114 by the monitor app 112 executed by the CPU2 110. Although only application service requests from source Internet protocol addresses that are not on the blacklist of the may be processed by the server app 108, all application service requests that are sent to the server 102 are copied to the RAM-based memory 114 and counted by the monitor app 112. When the total number of application service requests sent to the server 102 exceeds a predefined threshold A, the monitor app 112 copies the application service requests from the RAM-based memory 114 to the Disk file system 116 and further analyzes the application service requests.

At block 312, whether the rate of application service requests associated with an Internet protocol address exceeds a threshold B is determined. After the monitor app 112 copied the application service requests to the disk file system 116, the monitor app 112 further analyzes the application service requests per unique source Internet protocol address. For example, the monitor app 112 may review the fields of packet type, size and total number of the application service request packets per unique source Internet protocol address. In an embodiment, the monitor app 112 may calculate the rate of the application service request from a single source Internet protocol address based on the total time the packet capture ran. When the rate of the application service requests per unique source Internet protocol address exceeds a predefined threshold B, the monitor app 112 may take proactive actions. Also, when the overall sizes of the application service answers are abnormal, for example when the application service answers are too large, the monitor app 112 may take proactive actions.

At block 314, a message is sent to the firewall app 104 to blacklist an Internet protocol address when the rate of application service request associated with the source Internet protocol address exceeds the threshold B. The only exception would be if the source Internet protocol address is on the whitelist of the monitor app 112. If the source Internet protocol address associated with a total number of application service requests is on the whitelist of the monitor app 112, the monitor app 112 will not put the source Internet protocol address on the blacklist. At block 316, by doing steps 302 through 314, the rate of application service requests of remote hosts associated with a service request rate that exceeds the predefined threshold B is limited.

Figure 4:
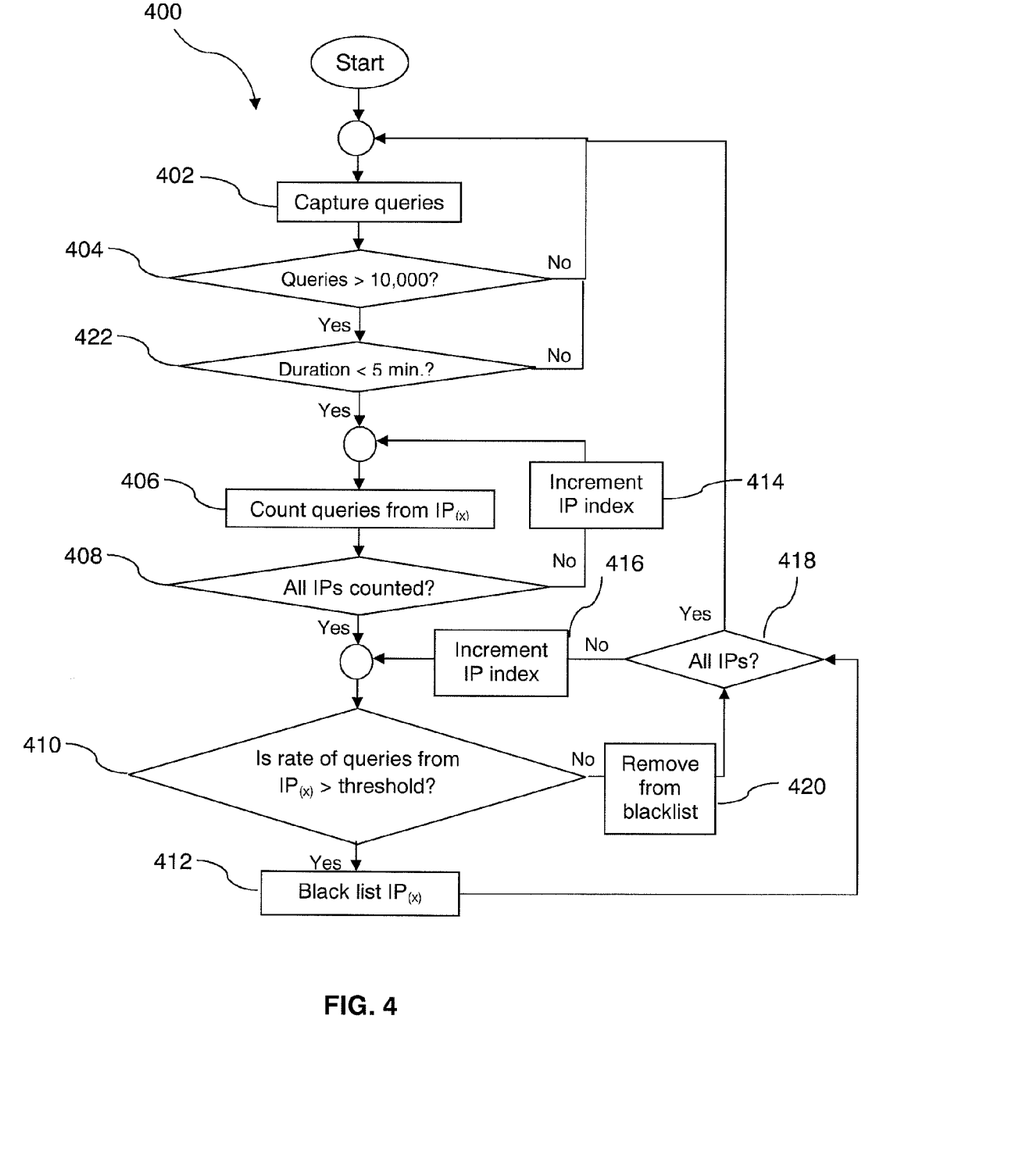
FIG. 4 is a flow chart illustrating another method according to an embodiment of the disclosure.

FIG. 4 shows a flow chart of the method 400. At block 402, application service queries are captured at the server 102. At block 404, it is determined whether the total number of queries captured is greater than 10,000, which is a predefined amount, or some other amount. If the result of block 404 is false, which means the total number of the queries is equal to or smaller than 10,000, the method/program restarts, and goes to block 402 again. On the other hand, if the result of block 404 is true, block 422 is executed. At block 422, it is determined whether the time interval is greater than five minutes, which is a predefined time interval, or another time interval, for packet capture with a total number of over 10,000. If the time interval is greater than five minutes, the program/method goes back to block 402, resets the timer, the counter, and starts capturing packets again. However, if block 422 is true and the duration is less than five minutes for packet capture with a total number of over 10,000, block 406 is executed and queries from a single source Internet protocol address $IP_{(x)}$ is counted.

The expression $IP_{(x)}$ is meant to refer to one of the IP addresses identified as a source address in the queries captured over the time interval. For example, if all the queries captured over the time interval designated five different IP source addresses, this expression would refer to $IP_1$, $IP_2$, $IP_3$, $IP_4$, and $IP_5$. In the descriptions below, when an index is said to be incremented, this simply refers to doing something with reference to a different one of the IP addresses. For example, processing IP(1) means processing with reference to the $IP_1$, processing IP(2) means processing with reference to $IP_2$. Incrementing the index from 1 to 2 simply means changing the analysis activity from IP1 to IP2. It is understood that the example of five IP source addresses spoken of above was chosen for convenience. In practice, the queries received over the time interval may have hundreds or thousands of different IP source addresses.

At block 408, it is determined whether all Internet protocol addresses have been counted. If the result of block 408 is true and all Internet protocol addresses have been counted, block 410 is executed, and it is determined whether the rate of queries from a single Internet protocol address $IP_{(x)}$ is greater than a predefined threshold. If the result of block 408 is false, which means not all Internet protocol addresses have been counted, the method/program goes to block 414, and then block 406 again. At block 414, Internet protocol address index is incremented, and queries with an IP source address from the next Internet protocol address are counted in the next iteration of block 414, at block 406. For example, when the Internet protocol address just counted in block 406 was $IP_{(x)}$, the queries with a source IP address of $IP_{(x+1)}$ will be counted. Block 406, block 408, and block 414 comprise a loop that is iteratively repeated to build a query count for each one of the different IP addresses listed as an IP source address in the queries collected over the time interval.

When all the queries for each of the different Internet protocol addresses are counted and block 408 becomes true, block 410 is executed. In an embodiment, at block 410, it is determined whether the rate of queries from a single Internet protocol address $IP_{(x)}$ is greater than a predefined threshold. With the total number of queries from a single Internet protocol address $IP_{(x)}$ counted at block 406 and the time interval for capturing the queries, which is 5 minutes in this case, the rate of queries from a single Internet protocol address $IP_{(x)}$ can be calculated. If the result of block 410 is true, which means the rate of queries from the single Internet protocol address $IP_{(x)}$ is greater than the predefined threshold, block 412 is executed. At block 412, a list of Internet protocol addresses is blacklisted that are associated with rates larger than a predefined rate limit. If the result of block 410 is false, which means the rate of queries from a single Internet protocol address $IP_{(x)}$ is equal to or smaller than the predefined rate limit, block 420 is executed, and $IP_{(x)}$ may be removed from the blacklist that the firewall 104 maintains, for example if $IP_{(x)}$ is currently on the blacklist. Note, the processing of block 420 may be performed for Internet protocol addresses that were previously black listed but that are not associated with any queries during the current time interval. With block 420, it is achieved that when source Internet protocol addresses stop sending abusive traffic, they are removed from the black list, and their application service requests can be answered afterwards. The next step of both block 412 and 420 is block 418, where it is determined whether rates of queries from all relevant Internet protocol addresses have been executed in block 410. If the result of block 418 is false, which means not all rates of queries from all relevant Internet protocol addresses have been executed in block 410, block 416 is executed. At block 416, the source Internet protocol address index is incremented, and the program goes to block 410 to check whether the rate of queries from a single Internet protocol address $IP_{(x)}$ is greater than a predefined threshold. The block 410, block 412, block 418, and block 416 comprise a loop to make sure rates of queries from all relevant Internet protocol addresses are compared to the predefined rate limit, and further action is conducted after the comparison. If the result of block 418 is true, which means rates of queries from all relevant Internet protocol addresses have been executed in block 410, the method/program restarts from the very beginning, block 402. Queries from all relevant Internet protocol addresses are collected for 5 minutes, and a new cycle of the program starts gain.

Figure 5:
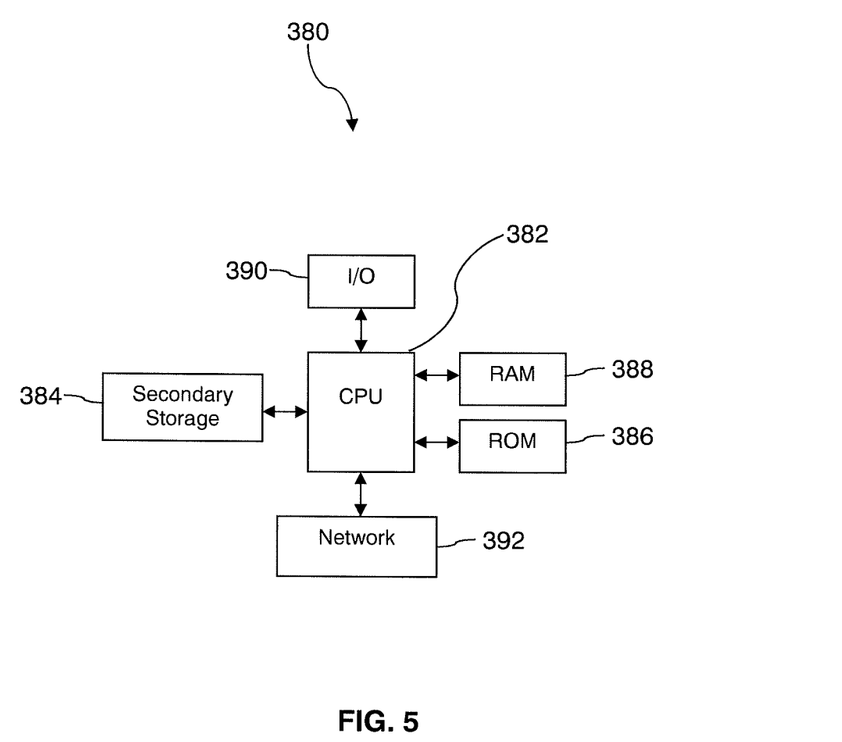
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for managing application service requests, comprising:
    a memory;
    a first processor;
    a second processor;
    an operating system that receives a total number of service requests within a predefined time interval, wherein the total number of service requests comprises a plurality of Internet protocol addresses, copies the total number of service requests from a network capturing tool to the memory, and derives a subset of service requests from the total number of service requests by purging service requests among the total number of service requests that comprise a black listed Internet protocol address;
    a domain name service server application stored in the memory that, when executed by the first processor,
        receives the subset of service requests from the operating system, and
        processes the subset of service requests; and
    a service request monitor application stored in the memory of the system that, when executed by the second processor,
        reads the total number of service requests from the memory,
        counts the total number of service requests, determines a rate of the total number of service requests associated with the plurality of Internet protocol addresses based on the counts, determines when the rate of the total number of service requests associated with the plurality of Internet protocol addresses exceeds a first threshold, wherein a rate of at least 5,000 is the first threshold for the total number of service requests associated with the plurality of Internet protocol addresses over a five minute interval, responsive to the rate of the total number of service requests associated with the plurality of Internet protocol addresses exceeding the first threshold, analyzes a rate of service requests associated with each Internet protocol address of the plurality of Internet protocol addresses, determines when the rate of service requests associated with an Internet protocol address of the plurality of Internet protocol addresses exceeds a second threshold, and sends a message to the operating system to black list the Internet protocol address responsive to the rate of service requests associated with the Internet protocol address exceeding the second threshold, whereby the service request monitor application limits the rate of service requests associated with a single Internet protocol address.

2. The system of claim 1, wherein the first threshold is 10,000 domain name service lookup requests over a five minute time interval.

3. The system of claim 2, wherein the second threshold is 450 domain name service lookup requests per second.

4. The system of claim 1, wherein the service request monitor application, when the rate of service requests associated with the Internet protocol address of the plurality of Internet protocol addresses exceeds the second threshold, writes the total number of service requests to a file and then deletes the total number of service requests from the memory.

5. The system of claim 1, wherein the service request monitor application, when the rate of the total number of service requests does not exceed the first threshold, deletes the total number of service requests in the memory without analyzing the rate of service requests associated with each Internet protocol address of the plurality of Internet protocol addresses.

6. A method of managing application service requests, comprising:

receiving a plurality of application service requests, wherein the plurality of application service requests comprises a plurality of Internet protocol addresses of a plurality of remote hosts;

copying the plurality of application service requests to a memory;

purging, by a firewall application, application service requests among the plurality of application service requests comprising an Internet protocol address that is black listed by the firewall application;

processing, by a processor of a server computer, the application service requests that were not purged by the firewall application;

counting, by a service request monitor application executed by a processor of a server computer, the total number of application service requests copied to the memory;

determining a total number of the total number of application service requests associated with the plurality of Internet protocol addresses received in a predefined time interval;

determining when the total number of the total number of application service requests associated with the plurality of Internet protocol addresses exceeds a first threshold, wherein a rate of at least 5,000 is the first threshold for the total number of application service requests associated with the plurality of Internet protocol addresses over a five minute interval;

responsive to the total number of the plurality of application service requests associated with the plurality of Internet protocol addresses exceeding the first threshold, determining a rate of application service requests associated with each Internet protocol address of the plurality of Internet protocol addresses;

determining when the rate of application service requests associated with an Internet protocol address of the plurality of Internet protocol addresses exceeds a second threshold, wherein at least 300 is the second threshold for the rate of application service requests associated with the Internet protocol address per second; and taking proactive action responsive to the rate of application service requests associated with the Internet protocol address exceeding the second threshold, whereby the rate of service requests of remote hosts is limited.

7. The method of claim 6, wherein when the total number of the plurality of application service requests received during the predefined time interval does not reach the first threshold, the rate of application service requests associated with each Internet protocol address of the plurality of Internet protocol addresses is not determined.

8. The method of claim 6, further comprising sending a message to the firewall application to remove the Internet protocol address added to the black list a predefined period of time after the Internet protocol address was added to the black list.

9. The method of claim 6, wherein at least one Internet protocol address associated with the plurality of application service requests is white listed in the firewall.

10. The method of claim 6, further comprising, when the rate of application service requests associated with the Internet protocol address of the plurality of Internet protocol addresses exceeds the second threshold, copying the plurality of application service requests in the memory to a file.

11. The method of claim 6, wherein the plurality of application service requests includes at least one of requests for domain name service lookups, requests for simple mail transport protocol lookups, or requests for hypertext transfer protocol content.

12. A method of parrying a domain name service amplification denial of service attack, comprising:

receiving a plurality of domain name service requests, wherein the plurality of domain name service requests comprises a plurality of Internet protocol addresses of a plurality of remote hosts;

copying the plurality of domain name service requests to a memory;

purging, by a firewall application, domain name service requests among the plurality of domain name service requests comprising an Internet protocol address that is black listed by the firewall application;

processing, by a processor of a server computer, the domain name service requests that were not purged by the firewall application;

counting, by a service request monitor application executed by a processor of a server computer, the plurality of domain name service requests;

determining a total number of the plurality of domain name service requests associated with the plurality of Internet protocol addresses received in a predefined time interval;

determining when the total number of the plurality of domain name service requests associated with the plurality of Internet protocol addresses exceeds a first threshold, wherein a rate of at least 5,000 is the first threshold for the total number of the plurality of domain name service requests associated with the plurality of Internet protocol addresses over a five minute interval;

responsive to the total number of the plurality of domain name service requests associated with the plurality of Internet protocol addresses exceeding the first threshold, determining a rate of domain name service requests associated with each Internet protocol address of the plurality of Internet protocol addresses;

determining when the rate of domain name service requests associated with an Internet protocol address of the plurality of Internet protocol addresses exceeds a second threshold, wherein at least 300 is the second threshold for the rate of domain name service requests associated with the Internet protocol address per second; and sending a message to the firewall application to black list the Internet protocol address responsive to the rate of domain name service requests associated with the Internet protocol address exceeding the second threshold, whereby the rate of domain name service requests of remote hosts is limited.

13. The method of claim 12, wherein the second threshold is 450 domain name service requests per second.

14. The method of claim 13, wherein determining the rate of domain name service requests associated with each Internet protocol address of the plurality of Internet protocol addresses is performed in response to counting 10,000 domain name service requests.

15. The method of claim 14, wherein determining the rate of domain name service requests associated with each Internet protocol address of the plurality of Internet protocol addresses is performed in response to counting at least 10,000 domain name service requests within five minutes.

16. The method of claim 12, further comprising sending a message to the firewall application to remove the Internet protocol address from the black list a predetermined time after it is added to the black list.

17. The method of claim 12, wherein at least one Internet protocol address is white listed in the firewall application.

18. The method of claim 16, further comprising resetting to the predetermined time a timer associated with a black listed Internet protocol address responsive to domain name service requests associated with the black listed Internet protocol address again exceeding the second threshold.

* * * * *